July 8, 1958  R. W. GILBERT  2,842,727
FREQUENCY METERING ARRANGEMENT
Filed April 2, 1954
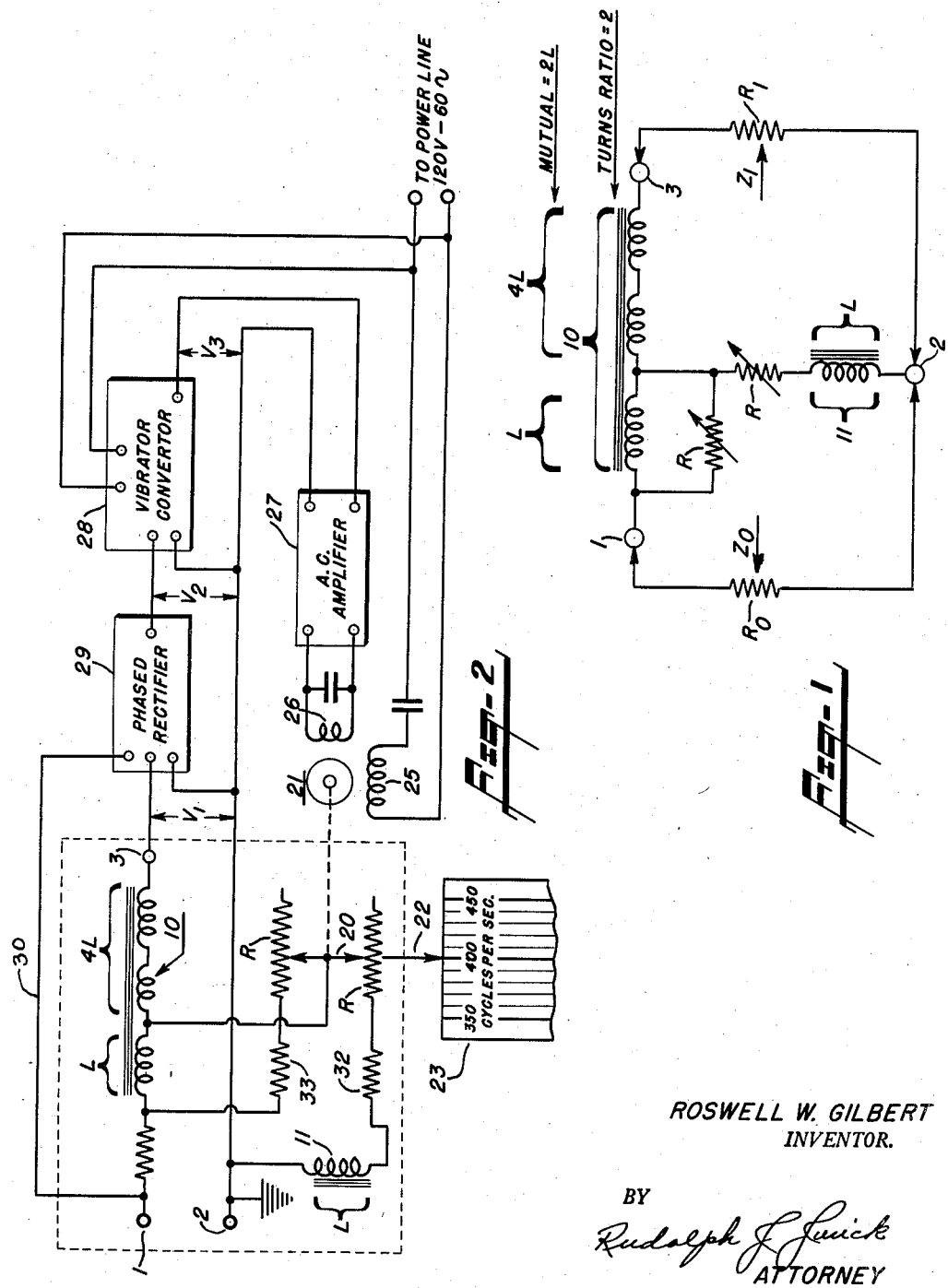
ROSWELL W. GILBERT
INVENTOR.
BY
Rudolph J. Junick
ATTORNEY

United States Patent Office 2,842,727
Patented July 8, 1958

2,842,727

FREQUENCY METERING ARRANGEMENT

Roswell W. Gilbert, Morristown, N. J., assignor, by mesne assignments, to Daystrom, Incorporated, Murray Hill, N. J., a corporation of New Jersey Application April 2, 1954, Serial No. 420,499

4 Claims. (Cl. 318—28)

This invention relates to electrical networks having the property of null balance at a given frequency and more particularly to a novel resistance-inductance null-frequency network which has a linear frequency/resistance relationship.

For purposes of indicating or metering frequency variations three broad types of null transfer networks are appropriate depending upon the particular frequency range spread required. Specifically, the case of relatively narrow range spreads the inductance-capacitance-resistance (L–C–R) networks are generally applicable. On the other hand, the saturating transformer type of network is best suited for relatively broad range spreads and particularly when a zero frequency mark is desired on the scale of the indicating instrument. However, for median range applications wherein the maximum deviations with respect to a center, null frequency have a ratio of about 0.15 to 1.0, the resistance-reactance (R–X) networks are most appropriate.

Of the R–X networks the bridged-T and the Wien Bridge R–C networks are best known and widely used. However, in all R–C networks both the resistance and capacitance are linearly related to periodicity rather than frequency and when it is desired to calibrate a linear resistance in terms of frequency a reciprocal scale distribution results. This is particularly objectionable in servo recorders wherein it is desirable to match a linear chart paper.

An object of this invention is the provision of a novel resistance-inductance, nul frequency network having a linear frequency/resistance relationship.

An object of this invention is the provision of a null-frequency, resistance-inductance network for use in a metering circuit said network having a linear frequency/resistance characteristic whereby the metering element responds linearly to changes in the frequency of the source connected thereto.

An object of this invention is the provision, in a potentiometric recorder, of an R–L null-frequency network said network having a linear frequency/resistance relationship whereby frequency deviations automatically rebalance the network and produce corresponding records on the recorder chart.

An object of this invention is the provision of a three-terminal R–L network having the property of adjustable null balance with frequency and wherein the relationship between frequency changes and resistance is a linear function.

These and other objects and advantages will become apparent from the following description when taken with the accompanying drawings illustrating the invention. It will be understood the drawings are for purposes of illustration and are not to be construed as defining the scope or limits of the invention, reference being had for the latter purpose to the claims appended hereto.

In the drawings wherein like reference characters denote like parts in the several views:

Figure 1 is a circuit diagram of my basic R–L network; and

Figure 2 is a diagram showing my circuit incorporated in a potentiometric-type recorder.

Referring to Figure 1, my basic, null-frequency network comprises the mutual inductance 10, self inductance 11 and two equal, adjustable resistors R. The inclusion of the mutual inductance results in a 3-terminal network having certain advantages which will appear hereinbelow. For a resonant frequency null, the mutual inductance has a turns ratio of 2, giving a self-inductance ratio of 4, assuming unity coupling. The resonant frequency/resistance relationship for this circuit is:

$$\frac{f}{R} = \frac{1}{2\pi L} = \text{constant} \tag{1}$$

in contrast to R–C circuits wherein the product rather than the ratio of frequency and resistance is a constant.

In general, resistance-reactance networks are ideal only when properly terminated so as to operate in so-called symmetrical condition. Otherwise, the circuit can introduce phase shifts larger than 90 degrees at very high or very low frequencies thereby causing instability in feedback systems. When the Figure 1 network is loaded symmetrically, as by the input resistance $R_0$ and the output resistance $R_1$, the transfer impedance locus is a simple circle and the magnitude is equal at zero and infinite frequencies. The criterion for this network is, therefore, $$R_0 R_1 = (3R)^2 \tag{2}$$

wherein $R_0$ and $R_1$ are the terminating resistances. This condition should be observed at least approximately at the center of the frequency range.

As the network is linear and passive its transfer impedance obeys reciprocity and it may be used in either direction. However, the network includes transformation in the mutual reactor and it has different self-impedances looking into each end, $Z_1$ and $Z_0$, as shown. The impedances are in the ratio, $$\frac{Z_0}{Z_1} = \frac{1}{2} \tag{3}$$

with $$Z_0 = \frac{3}{2}(R + jR) \tag{4}$$

and $$Z_1 = 3(R + jR) \tag{5}$$

at the resonant frequency.

When the network is applied to sources and loads where power economy is important, the terminating resistances $R_0$ and $R_1$ should be proportioned for optimum energy transfer about the resonant frequency. In this case, from Equation 3, above, $$\frac{R_0}{R_1} = \frac{1}{2}$$

and from Equation 2, above, $$R_0 = \frac{3R}{\sqrt{2}} \tag{6}$$

and $$R_1 = 3\sqrt{2}R \tag{7}$$

In practice, the reactor windings have some resistance and core loss as a result of which the network will not balance exactly at the theoretical value. However, it has been found practical to finally adjust the network experimentally to a point where equal increments of R will give a tracking balance, and the result will still be fairly linear. In practice, also, the reactors should have a reasonably good quality at the operating frequency by using appropriate-size cores and a suitable air gap ratio.

In the application of the network to a recorder the adjustable balancing resistors R may be in part the dual slide wires of the potentiometer and in part fixed resistors proportioned to provide the desired range spread.

Reference is now made to Figure 2 which is a diagram showing my network incorporated in a potentiometric-type recorder. Those skilled in this art will understand that the resistors R comprise equal resistance windings which may be peripherally disposed in parallel relation on a circular disc of insulating material. These windings are bridged by the slider 20 that is mechanically coupled to a reversible drive motor 21 for movement in either direction to maintain balance of the measuring network. Such balancing movement of the slider 20 results in a corresponding linear movement of the inking pen 22 which draws a line on the continuously moving strip chart 23. As shown in the drawings, the chart has a calibrated range of 350-450 cycles per second with a center frequency of 400.

The drive motor 21 is provided with two field windings 25, 26, the former energized directly and continuously by the 120 volt, 60 cycle power source and the latter being connected to the output of the A. C. amplifier 27. A vibrator-converter 28 is also energized by the 60 cycle power source, the character of the current fed to such vibrator being controlled by the phased rectifier 29 that is connected to the recorder input terminal 1 by the lead 30. For purposes of clarity, the network terminals 1, 2 and 3 which are shown in Figure 1 are similarly shown in Figure 2, and the Figure 1 network is shown within the dotted lines. It may here be pointed out that the control elements of the recorder, specifically the rectifier 29, converter 28, amplifier 27 and drive motor 21, constitute conventional arrangements known in the recorder art and, therefore, the block showing of Figure 2 is deemed adequate.

The network terminals 1 and 2 constitute the recorder input terminals to which is connected the source whose frequency is to be continuously recorded on the chart 23. In the illustrated arrangement, the inductances L are assigned such values that the recorder pin 22 will draw a line at the center of the chart when the input frequency is 400 cycles per second. Any variation in the frequency of the source will produce an A. C. error voltage $V_1$ across the network output terminals 2, 3 which error voltage is applied to the phased rectifier 29. The phased rectifier develops a D. C. error voltage $V_2$ which varies in sense and magnitude with the voltage $V_1$. Such D. C. error voltage $V_2$ is converted to a corresponding A. C. voltage $V_3$ by the vibrator 28 and applied as a signal to the A. C. amplifier 27. Consequently, an amplified voltage is impressed across the motor winding 26 such voltage having a definite phase relation to that applied across the other motor winding 25. Therefore, the motor 26 rotates in a direction such as to move the potentiometer slider 20 along the resistances R to re-establish a balance in the measuring network. At such new, network-balanced position of the slider, the pen 22 will draw a record on the chart along the line corresponding to the frequency of the source connected to the input terminals 1 and 2.

The frequency spread of the chart scale is controlled by the magnitude of the fixed resistors 32, 33. The use of a 3-terminal network arrangement permits a common input-output ground connection, thereby avoiding the need of a balanced output transformer.

My novel resistance-inductance network has the following desirable features:

(1) The 3-terminal transfer function obviates the need of a balanced output transformer since a common input-output ground can be used, (2) The network balancing resistors are equal and, therefore, the network is directly applicable to potentiometric records which normally have a dual slide wire of similar resistance per unit length, (3) The resistive parameters have a common end junction allowing a single connection to the recorder slider.

Although the above description of my network is limited to the application of the network to direct frequency metering it will be apparent that the invention is useful in any system wherein a change in a condition produces a corresponding change in the frequency of an A. C. current. For example, the Figure 2 circuit can be used to indicate and/or record speed by connecting an alternating current tachometer to the input terminals.

Having now given a detailed description of my invention in accordance with the patent statutes what I desire to protect by Letters Patent of the United States is set forth in the following claims.

I claim:

1. A three terminal, frequency-responsive, null transfer network comprising an input terminal, an output terminal and a common terminal, a first inductive reactor connected between said input and output terminals, a second inductive reactor establishing a connection between said common terminal and a point on said first reactor, a first variable resistance element connected in parallel relationship to a portion of the said first reactor, and a second variable resistance element connected in series relationship to the second reactor.

2. The invention as recited in claim 1, wherein the first and second resistance elements are simultaneously variable to establish the frequency of the null transfer of the network.

3. The invention as recited in claim 2, wherein network unbalance effects the variation of the resistance elements employing a reversible electric motor.

4. The invention as recited in claim 3, wherein means are provided for recording the variations in said resistance elements.

References Cited in the file of this patent

UNITED STATES PATENTS

| 1,977,751 | Zobel | Oct. 23, 1934 |
| 2,468,350 | Sunstein | Apr. 26, 1949 |
| 2,484,573 | Kezer | Oct. 11, 1949 |
| 2,490,428 | Gluyes | Dec. 6, 1949 |
| 2,553,208 | Petroff | May 15, 1951 |
| 2,655,627 | McWade | Oct. 13, 1953 |